Feb. 22, 1955　　　W. H. DOERFNER　　　2,702,529
VALVE ADAPTED FOR HYDRAULIC POWER STEERING USE
Filed April 23, 1952　　　　　　　　　　　3 Sheets-Sheet 1
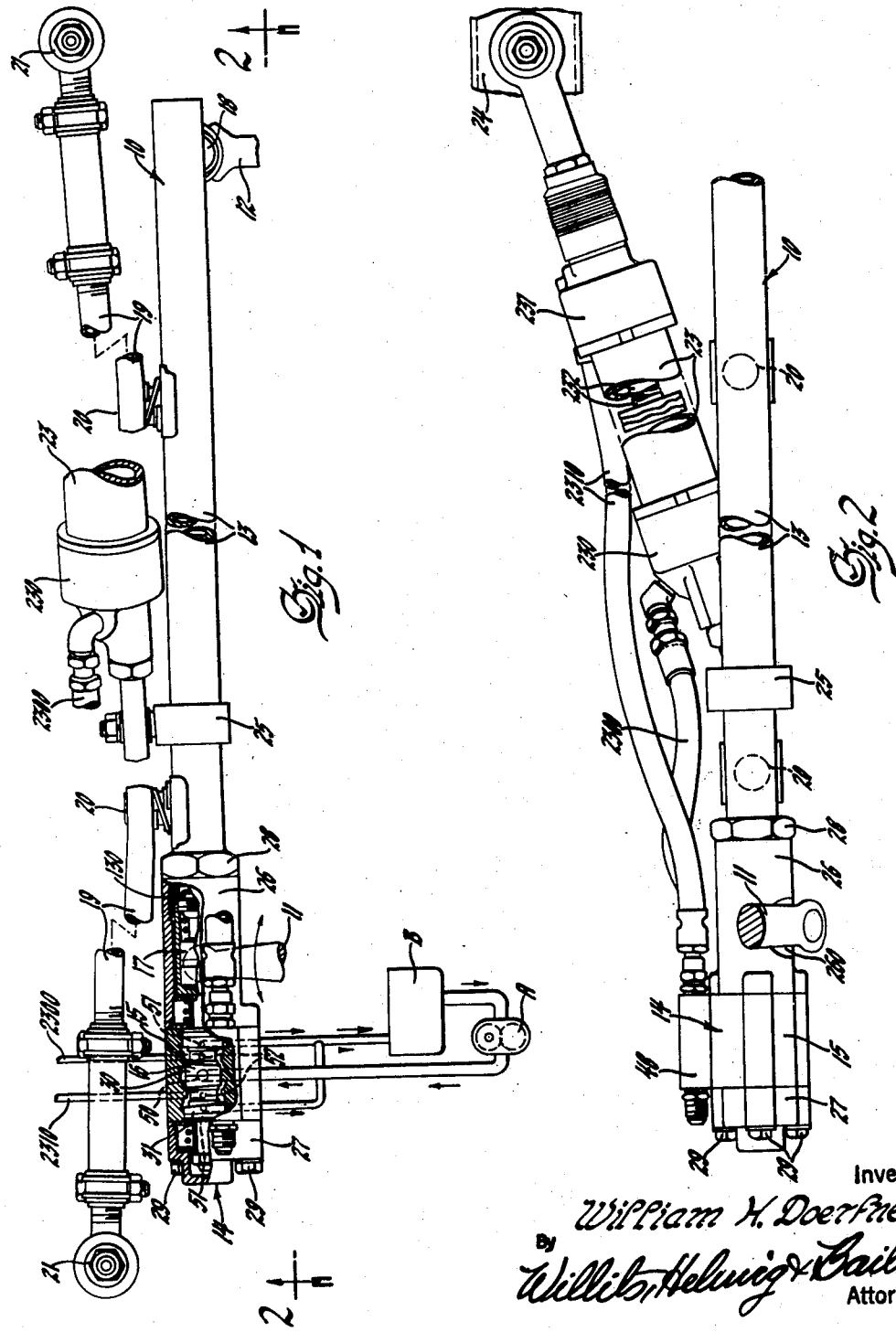
Inventor
*William H. Doerfner*
By *Willis, Helwig & Baillio*
Attorneys Feb. 22, 1955 W. H. DOERFNER 2,702,529
VALVE ADAPTED FOR HYDRAULIC POWER STEERING USE
Filed April 23, 1952 3 Sheets-Sheet 2

Inventor
William H. Doerfner
By Willits, Helmig & Baillie
Attorneys

Feb. 22, 1955 W. H. DOERFNER 2,702,529
VALVE ADAPTED FOR HYDRAULIC POWER STEERING USE
Filed April 23, 1952 3 Sheets-Sheet 3

Inventor
William H. Doerfner
By Willits, Helmig & Bailie
Attorneys.

United States Patent Office 2,702,529
Patented Feb. 22, 1955

2,702,529

VALVE ADAPTED FOR HYDRAULIC POWER STEERING USES

William H. Doerfner, Saginaw, Mich., assignor to General Motors Corporation, Detroit, Mich., a corporation of Delaware Application April 23, 1952, Serial No. 283,950

4 Claims. (Cl. 121—46.5)

This invention relates to improvements in a hydraulic power steering mechanism for motor vehicles, and in particular to improved valve means for the application of hydraulic power steering effort to mechanical steering apparatus.

In the prior art hydraulic power steering mechanisms, the control valve is mounted on the steering column in some installations while in other installations the control valve is mounted on the cross rod or elsewhere in the steering linkage. It is important that the valve be mounted in a location and in a manner that it will be operated responsive to manual steering effort applied to the steering gear through the steering wheel of the vehicle.

The application of hydraulic power steering effort to the mechanical steering mechanism of the vehicle must not be sudden inasmuch as extremely rapid application of power steering responsive to the application of manual steering effort would create an undesirable jerk in the steering "feel."

With the foregoing in view, the primary object of the invention is to provide an improved means for applying hydraulic power steering effort to the conventional steering gear of automative vehicles responsive to manual turning of the steering wheel thereof which applies the power steering effort in a very smooth and gradual manner.

Another object of the invention is to provide an improved yet inexpensive control valve particularly advantageous in hydraulic power steering mechanisms which smoothes out and cushions the otherwise relatively abrupt transition from manual steering effort to power steering effort.

A further object of the invention is to provide an improved, simply constructed, economical to manufacture combined spring and hydraulically centered control valve for hydraulic power steering mechanisms which functions to apply hydraulic steering effort gradually and smoothly to the mechanical steering gear of a motor vehicle responsive to the application of a predetermined amount of manual steering effort to the said mechanical steering gear through the steering wheel of the vehicle, the said valve providing a substantially normal steering "feel" at the steering wheel through the hydraulic steering mechanism proportionate to the manual steering effort required to actuate the same.

Other objects of the invention will become apparent by reference to the following detailed description taken in connection with the accompanying drawing, in which:

Fig. 1 is a plan view of a portion of the steering linkage of a motor vehicle showing in connection therewith hydraulic power steering mechanism incorporating the invention.

Fig. 2 is a fragmentary elevational view taken on the line 2—2 of Fig. 1.

Figure 3:
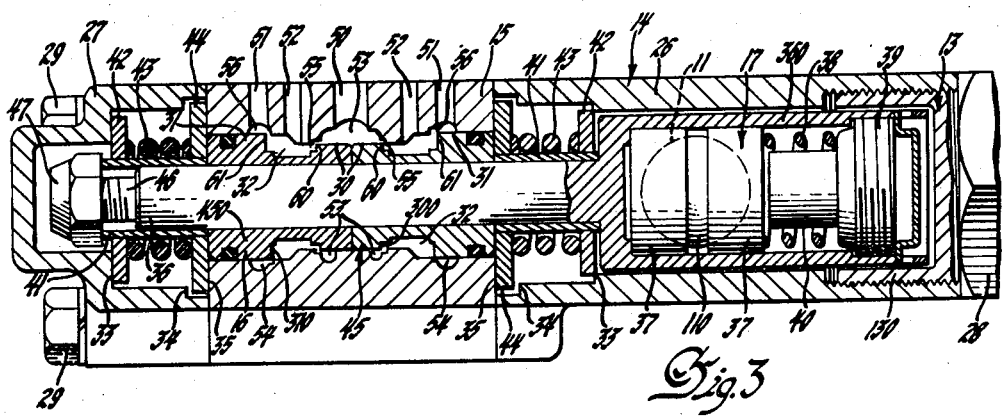
Fig. 3 is an enlarged vertical sectional view of the improved control valve on the cross rod construction preferably employed.

Referring now to the drawings wherein like numerals refer to like and corresponding parts throughout the several views, the illustrative embodiment of the invention is disclosed in connection with a steering gear 10, only a portion of which is shown. The steering gear 10 may comprise the usual steering column, steering shaft and steering wheel, a worm and sector connection between the steering column and a swingable pitman arm 11. An idler arm 12 is swingably mounted on the vehicle frame laterally spaced from the pitman arm 11 for arcuate movement precisely the same as that of the pitman arm 11. A cross rod 13 sometimes called an intermediate rod forming a part of the steering relay link assembly is mounted on the pitman arm 11 and idler arm 12.

A hydraulic steering control valve generally designated by the numeral 14 is mounted on the cross rod 13 preferably at the point of connection of the pitman arm 11 thereto, however, the control valve 14 may be installed anywhere in the steering gear linkage or in the steering column where manual steering effort applied to the steering wheel to steer the vehicle, road resistance to steering, and self-righting effort from the vehicle wheels responsive to the steering geometry are available to actuate or control the functioning of the control valve. In the illustrative embodiment of the invention disclosed herein, the housing 15 of the control valve 14 is rigidly connected to the cross rod 13, and within the valve housing 15 is a movable valve member 16 to which the ball end of the pitman arm 11 is connected by a ball and socket connection 17. Likewise, the ball end of the idler arm 12 is connected to the cross rod 13 by a ball and socket connection 18. Tie rods 19 are connected at their inner ends to the cross rod 13 by ball and socket connections 20 and engage wheel steering arm 21. Thus, any manual steering effort applied to the steering gear, any resistance to steering from the wheels of the vehicle, and self-righting effort from the vehicle wheels responsive to the steering gear geometry usually employed is applied to the control valve 14.

The hydraulic system preferably used to apply hydraulic power steering effort to the steering gear usually comprises an engine driven pump A, a reservoir B for hydraulic fluid connected to the suction side of the pump and a double acting power cylinder 23, not completely shown, and the control valve 14. The piston rod 232 extending from one end of the power cylinder 23 is connected to a vehicle frame member 24 while the housing at the other end thereof is connected to the cross rod 13 through a suitable clamp 25, universal movement being provided at both connections. The pressures employed in the hydraulic system generally range from 500 to 1000 p. s. i.; however, this pressure may vary widely according to the particular design employed. The particular embodiment of the invention disclosed herein for illustrative purposes was designed to operate at 750 p. s. i. It is obvious that a suitable pressure relief valve may be used in the hydraulic system or within the pump to maintain the pressure therein at the particular pressure for which the system is designed.

Referring now particularly to Figs. 1, 2 and 3, the housing 15 of the control valve 14 is preferably formed in three pieces for convenience in manufacture and to facilitate the assembly of the control valve 14 onto the cross rod 13. The three valve housing elements are the central portion or valve housing 15, a mounting sleeve 26 threaded on the threaded end 130 of the cross rod 13 and locked thereto by the lock nut 28, and a cap 27. The housing 15 including its mounting sleeve 26 and end cap 27 are each provided with suitable longitudinal bosses to accommodate bolts 29 employed to secure the said valve housing elements together. The valve housing 15 is bored and counterbored from both ends to accommodate the movable valve member 16 which is formed with a central land 30 and a pair of end lands 31 larger in diameter than the central land 30. Between the central land 30 and the end lands 31 of the movable valve element 16 are a pair of annular communicating chambers 32. The mounting sleeve 26 and the end cap 27 are each bored and counterbored to provide axially inwardly facing shoulders 33 and 34, and, the end faces of the housing 15 form axially outwardly facing shoulders 35 within the control valve 14 at the mounting sleeve 26 and the end cap 27, all of the said shoulders serving as abutments for elements of the movable valve member 16 as hereinafter described.

The movable valve member 16 comprises a central stem element 36 having an enlarged end portion 360 which is bored and counterbored to receive the ball seats 37 which engage the ball end 110 of the pitman arm 11 under spring loading of the compression spring 38 held in place by a threaded plug 39 having a stem 40 positioned adjacent the right hand ball seat 37 as viewed in Fig. 3 to limit the spreading of the ball seats 37 in respect to each other. The sleeve 26 on the right hand end of the valve housing 15 is apertured at 260, see Fig. 2, and the end portion 360 of the central stem 36 is apertured in alignment with the said aperture 260 in the sleeve 26 to accommodate the ball end 110 of the pitman arm 11 with sufficient clearance to permit necessary operational movement of the movable valve member 16 in respect to the valve housing 15 and slight movement of the spring loaded ball seats 37 within the end portion 360 of the central stem 36. The spring loading of the ball and socket connection between the pitman arm 11 and the movable valve member 16 is solely for the purpose of removing play in the ball and socket joint, and does not enter into the operational movement or functioning of the control valve 36.

On the central stem 36 of the movable valve member 16 and to the left of the enlarged end 360 thereof as viewed in Fig. 3 are telescoped in the following order a sleeve 41 over which is positioned an abutment washer 42 disposed against the shoulder 33 in the housing mounting sleeve 26, a valve centering spring 43 and a thrust washer 44, a valve spool 45 composed of two opposite hand spool elements 450 disposed in abutment with each other and formed to provide the movable valve member 16 with a central land 30 and a pair of end lands 31 preferably larger in diameter than the central land 30 and an annular communicating chamber 32 between the central land 30 and each of the end lands 31, and another sleeve 41 over which is positioned a thrust washer 44, a valve centering spring 43 and an abutment washer 42. The end of the central stem 36 is threaded at 46 to accommodate an anchorage nut 47 which, when drawn tightly against the sleeve 41 adjacent thereto, assembles the sleeves 41 and the valve spool elements 450 of the valve spool 45 in fixed relationship on the central stem 36 of the movable valve member 16 to the left of the enlarged end 360 thereof.

As shown in Figs. 1, 3, 4, 5 and 6, the outer ends of the central land 30 and the inner ends of the end lands 31 are obliquely formed at 60 and 61 respectively adjacent the communicating chambers 32. This provides a gradual application and removal of power steering effort responsive to movement of the valve spool or movable valve member 16 in respect to the valve housing 15. Obviously, in some installations, the valve member 16 may be stationary and the valve housing 15 may be movable. The extent of deformation of the lands 30 and 31 of the valve spools adjacent the communicating chambers 32 governs the rate of application of power steering effort to the mechanical steering mechanism responsive to movement of the movable valve element.

Figure 7:
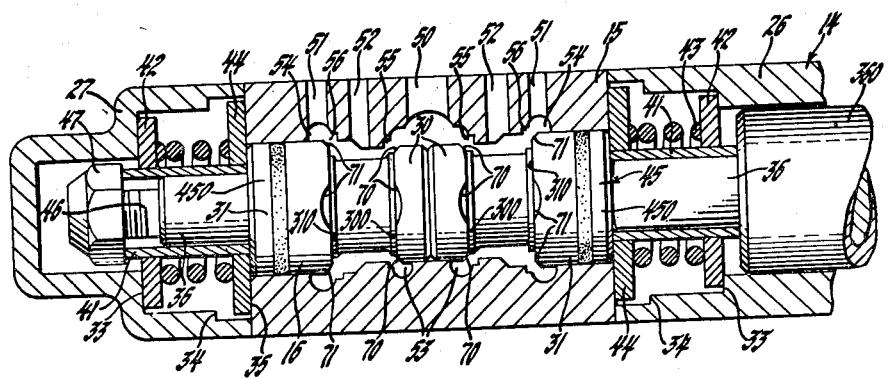
Fig. 7 is a more or less diagrammatic sectional view similar to Fig. 4 showing an alternate control valve construction embodying the invention in its neutral position with both its pressure ports and spill ports open.

Referring now to Fig. 7 illustrating a modified form of the invention, it will be observed that in this case the inner edges of the outer lands and the edges of the central land are spot chamfered at 71 and 70, respectively. With this construction the improvements provided by the invention are less pronounced. Nevertheless, if only a minimum of slowness in rate of application of power steering effort is desired, some such relatively small deformation of the outer ends of the lands 30 and 31 may be employed. However, in most instances the desired degree of retarding of the suddenness of application of power steering effort can be accomplished by extent of the obliqueness of the oblique formations 60 and 61 of the central land 30 and the end lands 31 respectively. Although not shown, variations in valve operation can be accomplished by obliquely forming either the central land 30 as at 60 or the end lands 31 as at 61. Accordingly, the present invention provides a great flexibility in the application thereof to the minute requirements of the transition between mechanical steering effort and power steering effort in hydraulic power steering mechanisms. Obviously, the advantages gained by practicing the invention in the application of power steering effort responsive to the application of manual steering effort through the steering wheel are equally true to a large degree in the release of power steering effort responsive to the release of manual steering effort on the steering wheel and the spring centering or combined spring and hydraulic centering of the control valve.

Figure 4:
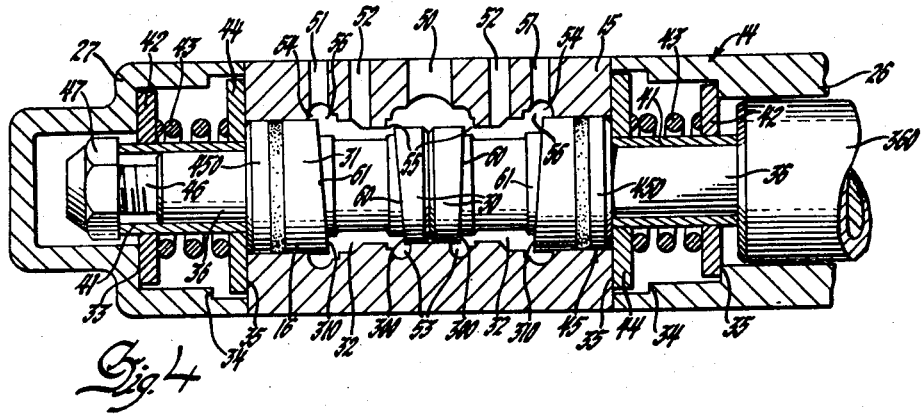
Fig. 4 is a further enlarged more or less diagrammatic sectional view similar to Fig. 3 showing the control valve in its neutral position with both its pressure ports and spill ports open.

When the movable valve member 16 is centered axially within the housing 15, the outer ends of the valve spool 45 are disposed in alignment with the axially outwardly facing valve housing shoulders 35, see Figs. 3 and 4. This centered or neutral position of the movable valve member 16 is resiliently maintained by the valve centering springs 43, one of which is disposed between the abutment washer 42 and thrust washer 44 at each outer end of the valve spool 45. The said thrust washer 44 acts against the outer ends of the valve spool 45 and the shoulders 35 of the valve housing 15 whereby to resiliently center the said movable valve member 16 in relationship thereto. When the movable valve member 16 is moved off-center in either direction, for example, to the left as viewed in Figs. 5 and 6, the valve spool 45 contacts the thrust washer 44 to the left thereof and compresses the adjacent valve centering spring 43 which constantly urges the movable valve member toward its centered or neutral position. When the valve member 16 is moved off-center to the right, a like and similar spring centering action takes place.

The movement of the movable valve member 16 of the control valve 14 off-center in either direction is relatively slight to cause the said control valve 14 to function, accordingly, the operational movement thereof is not detrimental to the functioning of the steering gear. The operational movement of the movable valve member 16 within the valve housing 15 is greatly exaggerated in Figs. 4, 5 and 6 to illustrate in detail the construction, portion and functioning of the said control valve 14. Manual steering of the vehicle accomplished by turning the steering wheel causes lateral movement of the cross rod 13 of the steering relay link assembly through the arcuate movement of the pitman arm 11 connected to the said cross rod 13 through the preferably spring centered movable valve member 16 of the control valve 14.

For normal light steering as when a motor vehicle is traveling along a relatively smooth road, the centering spring 43 may be of such strength as to prevent movement of the movable valve member 16 of the control valve 14 until a predetermined manual steering effort is applied to the steering wheel, for example, three pounds. Continuing the example, if a left turn were being made, the turning of the steering wheel to the left would swing the pitman arm 11 to the left as viewed in Figs. 1 and 2 and the pitman arm 11 would exert a force on the movable valve member 16 to the left. If the manual steering effort applied to the steering wheel to make the turn were less than three pounds, the movable valve member 16 would not move from its centered or neutral position and normal manual steering would be accomplished through the steering mechanism, and, upon release of the manual steering effort applied to the steering wheel, the geometry of the steering mechanism usually employed would return the steering mechanism to its normal straight driving position provided the vehicle was in forward motion. If the vehicle were not in sufficient forward motion for the mechanical self-righting action of the steering mechanism to return itself to its normal straight driving position, manual steering effort would be applied to the steering wheel for that purpose.

Figure 5:
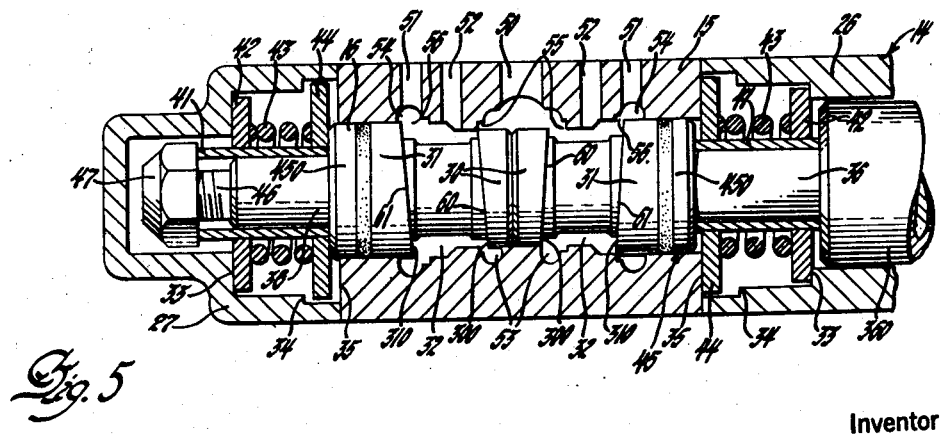
Fig. 5 is a more or less diagrammatic sectional view similar to Fig. 4 showing the control valve with its movable valve element moved in one direction to partially close one of the pressure ports and further open the other and to partially close one of the spill ports and further open the other, as when hydraulic power steering effort is initially applied.
Figure 6:
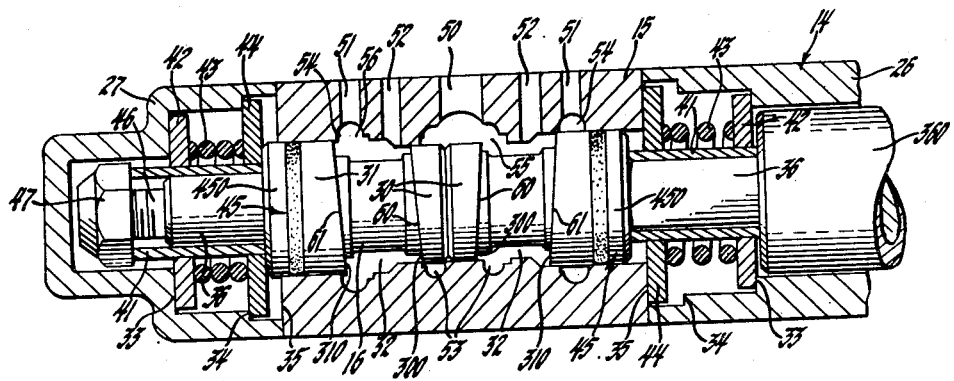
Fig. 6 is a more or less diagrammatic view similar to Fig. 5 except that the movable valve element has been moved further in the same direction fully closing of one of the pressure ports and further opening the other, and to completely close the partially closed spill port and completely open the other, as when full power steering effort is applied.

Further continuing the example, if it were necessary to apply a manual steering effort of more than three pounds to the steering wheel to accomplish the left turn, then the movable valve member 16 of the control valve 14 would be moved from its neutral position shown in Figs. 1, 3 and 4 to the left as shown in Figs. 5 and 6, the extent of the movement thereof depending upon the amount of manual effort exerted on the steering wheel over three pounds required to accomplish the movement of the movable valve member 16 against the force of a centering spring 43 plus the hydraulic centering force of the movable valve member 16 as hereinafter described in detail. Upon release of that portion of the manual steering effort in excess of three pounds required to make the left turn, the combined spring centering force of the centering spring 43 plus the hydraulic centering force of the movable valve member 16 plus the geometry of steering mechanism usually employed would return the steering mechanism to its normal straight driving position provided the vehicle was in forward motion. If the vehicle did not have a sufficient forward motion for the mechanical self-righting action of the steering mechanism to be effective, the release of that portion of the manual steering effort in excess of three pounds required to make the left turn would permit the combined spring centering force of a centering spring 43 plus the hydraulic centering force of the movable valve member 16 to return the movable valve member 16 to its centered or neutral position, and then manual effort would be applied to the steering wheel to return the steering mechanism to its normal straight driving position either manually or, if the manual effort required to right the vehicle were greater than three pounds, hydraulic steering effort would be applied through the control valve 14 responsive to manual turning of the steering wheel proportionate to but less than the road resistance of the wheels to being turned.

The control valve 14 has in the housing 15 thereof an inlet port 50 from the pump of the hydraulic system employed, outlet ports 51 to the reservoir thereof and power ports 52 to the double acting power cylinder 23, one power port 52 being connected to the power cylinder 23 at each side 230 and 231 of the piston thereof by means of flexible hose lines 2300 and 2310 respectively. Although the inlet port 50, the outlet ports 51 and the power ports 52 have been shown in the drawings in alignment with each other, it is obvious that they may be located otherwise to facilitate the connection thereof to the pump, the reservoir and the power cylinder 23 in any particular power steering installation. For example, a suitable manifold 48 may be employed to accomplish connections between the pump and the control valve 14, between the control valve 14 and the reservoir, and between the control valve 14 and the power cylinder 23. Also, many changes may be made in the components of the pressure fluid system employed, for example, two single acting cylinders or other fluid motor means may be substituted for the double acting power cylinder 23, and a single outlet port may be substituted for the two outlet ports 51 from the control valve 14 by interconnecting the outlet ports 51 within the valve 14 or the manifold 48.

The inner cylindrical face of the valve housing 15 of the control valve 14 is provided with a longitudinally central annular inlet passage 53 with which the inlet port 50 communicates. Spaced from the annular inlet passage 53 are a pair of annular outlet passages 54, one on each side thereof, which outlet passages 54 communicate with the outlet ports 51. Between the inlet passage 53 and each of the outlet passages 54 is a power port 52. The power ports 52 extend from the inner cylindrical face of the valve housing 15 to the outside thereof and are connected to the power cylinder 23, one on each side of the piston thereof. As before described, the outer cylindrical face of the movable valve member 16 is provided with a pair of annular communicating chambers 32, one of which is disposed between the central land 30 thereof and each of the two end lands 31 thereof which are larger in diameter than the central land 30.

As viewed in Figs. 1, 3 and 4 and as best shown in Fig. 4, the central land 30 is opposite to but narrower than the annular inlet passage 53, and the outer lands 31 partially opposite the axially outermost portions of the outlet passages 54 when the movable valve member 16 is in its central or neutral position in respect to the valve housing 15, in which neutral position hydraulic fluid such as oil or the like under pressure from the pump enters the inlet port 50, flows to and through the inlet passage 53 into both of the annular communicating chambers 32 through spaces between the inlet passage 53 and the annular communicating chambers 32 which are termed "pressure ports" and are indicated by the numeral 55 in Figs. 3–6 inclusive. From the annular communicating chambers 32 hydraulic fluid enters the outlet passages 54 and the power ports 52. The spaces between the annular communicating chambers 32 and the outlet passages 54 are termed "spill ports" and are indicated by the numeral 56 in Figs. 3–6 inclusive. From the outlet passages 54 the hydraulic fluid returns to the reservoir. The hydraulic fluid from the power ports 52 passes to the power cylinder 23 at opposite sides 230 and 231 of the piston thereof, and since the pressure on each side of the piston of the power cylinder 23 is equal when the movable valve member 16 is centered in its neutral position shown in Figs. 1, 3 and 4, the piston of the power cylinder 23 is at rest and no hydraulic power steering effort is transmitted by the said power cylinder 23 to the mechanical steering gear hereinbefore described in detail.

The hydraulic system employed in the illustrative embodiment of the invention is termed a "circulating system" wherein hydraulic fluid under pressure is available at all times to apply hydraulic power steering effort to the steering gear responsive to movement of the control valve 14. Although the spill ports 56 are shown both larger in diameter and wider than the pressure ports 55 and the importance of which in hydraulic power steering will be readily appreciated by reference to that portion of the description of the illustrative embodiment of the invention which follows, it is obvious that other porting arrangements, such as making the spill ports 56 larger in diameter but of the same width as the pressure ports 55, may be employed in connection with the improved and simplified hydraulic centering feature of the movable valve member 16 of the control valve 14 herein disclosed.

When the movable valve member 16 of the control valve 14 is moved from its neutral position shown in Fig. 4 to the left as viewed in Fig. 5, to initiate power steering effort when making a left turn, the pressure port 55 at the left of the inlet passage 53 is partially closed and hydraulic fluid from one end 231 of the power cylinder 23 returns to the reservoir through the power port 52 and outlet port 51 at the left of the inlet passage 53. At the same time, the spill port 56 between the outlet passage 54 and the communicating chamber 32 at the left of the inlet passage 53 has moved from its neutral open position to a more widely open position. A portion of the hydraulic fluid under less than normal pressure from the pump is now directed through the inlet port 50, the inlet passage 53 and the pressure port 55 to and through the communicating chamber 32 and the power port 52 at the right of the inlet passage 53, the said pressure port 55 having moved from its neutral open position to a more widely open position. Hydraulic fluid under less than normal pressure is applied from the said power port 52 at the right of the inlet passage 53 to the other end 230 of the power cylinder 23, and, at the same time, a portion of the hydraulic fluid under pressure from the said communicating chamber 32 passes through the partially closed spill port 56 at the right of the inlet passage 53 to the reservoir whereby to further modify the application of available hydraulic pressure from the pump to the said other end of the power cylinder 23. Thus a very desirable initial cushioning of the shock of the application of power steering effort to the steering gear is accomplished with the initial movement of the movable valve member 16.

When power steering effort is required to make the left turn over and above the initial power steering effort applied to the steering gear as hereinbefore described, manual steering effort is applied to the steering wheel in addition to that required to initiate power steering whereupon the movable valve member 16 of the control valve 15 is moved gradually from its power initiating position shown in Fig. 5 further to the left to its full power steering position shown in Fig. 6.

This gradual movement of the movable valve member 16 from its power initiating position shown in Fig. 5 to its full power steering position shown in Fig. 6, minutely and gradually applies a greater portion of the hydraulic fluid under an increasing pump pressure through the power port 52 at the right of the inlet passage 53 to the said other end 230 of the power cylinder 23, and, at the same time a lesser portion of the hydraulic fluid under pressure from the communicating chamber 32 passes through the spill port 56 at the right of the inlet passage 53 to the reservoir.

In the full power steering position of the movable valve member 16 when a left turn is being made, see Fig. 6, the pressure port 55 at the left of the inlet passage 53 is fully closed and hydraulic fluid from one end 231 of the power cylinder 23 is returned to the reservoir through the power port 52 and the outlet port 51 at the left of the inlet passage 53. The spill port 56 between the outlet passage 54 and the communicating chamber 32 at the left of the inlet passage 53 has moved to its full open position. Hydraulic fluid under full available pressure from the pump is directed through the inlet port 50, the inlet passage 53 and the pressure port 55 to and through the communicating chamber 32 and the power port 52 at the right of the inlet passage 53, the said pressure port 55 having moved to its full open position. Hydraulic fluid under full available pressure is now applied from the said power port 52 at the right of the inlet passage 53 to the said other end 230 of the power cylinder 20 without any portion thereof passing to the reservoir inasmuch as the spill port 56 at the right of the inlet passage 53 is fully closed, thus the application of all of the available hydraulic pressure from the pump to the said other end 230 of the power cylinder 23 is employed to accomplish full power steering effort. The increase of power steering effort from the initial cushioned application thereof to full application thereof is applied gradually and proportionate to the amount of manual steering effort applied to the steering wheel necessary to overcome the force or forces resisting steering and constantly urging the movable valve member 16 to center itself in its neutral or centered position.

Although not shown, a suitable ball check valve may be provided between the inlet passage 53 and an outlet passage 54 to allow circulation of hydraulic fluid within the hydraulic steering system in the event of pump failure or when steering is done when the vehicle engine is not running.

Inasmuch as the central land 30 of the valve spool 45 of the movable valve member 16 of the control valve 14 is smaller in diameter than the end lands 31 thereof, the larger end lands 31 provide opposite inwardly axially disposed faces 310 of a greater area than the outward axially disposed faces 300 of the central lands 30. Therefore, any hydraulic fluid under pressure within the valve housing 15 of the control valve 14 exerts more pressure against the axially disposed land faces 310 than against the axially disposed faces 300. Accordingly, the movable valve member 16 is constantly urged when off-center toward its centered or neutral position shown in Fig. 4 by hydraulic fluid under pressure in the annular inlet passage 53 and the annular communicating chamber 32. The more the said movable valve member 16 is off-center, as in Figs. 5 and 6, the greater the hydraulic pressure becomes within the valve housing 15 to exercise centering effect on the movable valve member 16.

Accordingly, the hydraulic pressure that exists within the control valve 14 at the various positions thereof is applied to the axially disposed faces 300 and 310 of the movable valve member 16, and, since the area of the faces 310 are greater than the faces 300, the hydraulic pressure within the control valve 14 urges the said movable valve member to center itself when off center. The greater the by-pass through the spill ports 56, the less the hydraulic centering effect on the movable valve member 16.

Inasmuch as the hydraulic pressure in the annular inlet passage 53 and the annular inlet passages 54 vary and gradually increase according to the extent of movement of the movable valve element from its neutral or centered position responsive to manual steering effort applied thereto through the steering wheel and steering mechanism, a corresponding gradually increasing manual steering effort is required as the road resistance to steering increases. Thus, the driver of the vehicle is presented with a "steering feel" to which he is accustomed proportionate to the road resistance to the steering of the vehicle both before and after the initial application of power steering effort.

When manual steering effort is required to effect hydraulic steering by moving the movable valve member 16 of the control valve 14 off-center, the combined hydraulic and spring centering means employed returns the movable valve member 16 to its centered or neutral position. Obviously, if the release of the manual steering effort required to initiate and increase the hydraulic power steering effort is gradual, the reduction of the power steering effort will be gradual. The employment of spill ports that are both larger in diameter and wider than the spill ports in the control valve 14 is particularly advantageous in that the control valve may be returned to neutral with even less resistance than heretofore deemed possible. Therefore, the employment of a valve spool structure having larger diameter end lands than its central land not only provides in hydraulic power steering systems very simple and effective hydraulic valve centering means proportionately responsive to road resistance to steering to provide a "steering feel" but further decreases any lag or slowness of the vehicle steering to right itself or to be steered in the opposite direction upon the steering wheel controlled release of power steering effort.

In the description of the operation of the hydraulic steering mechanism embodying the invention, the effect of making the spill ports both wider and larger in diameter than the pressure ports has been pointed out. However, in installations where the spill ports and pressure ports are of the same width and the spill ports are larger in diameter than the pressure ports which provides spill ports of greater area than the area of the pressure ports, the desirable hydraulic valve centering feature is accomplished; that is, the control valve is centered proportionately responsive to road resistance whereby to provide "steering feel" and is accompanied by a decrease in lag or slowness of the vehicle to right itself responsive to the action of the steering geometry normally employed or to be steered in the opposite direction upon steering wheel controlled release of power steering effort. The said decrease in lag or slowness of the vehicle to right itself or to be steered in the opposite direction after being steered in one direction depends largely upon the resistance of fluid flow through the spill ports, which resistance is proportionately less as the spill port area is increased. The foregoing is true whether the increased spill port area is accomplished by such means as the relative diameter of the center valve spool and the end spools alone, or is accomplished by the relative diameter of the center valve spool and the end spools plus an increased width of the spill ports.

The employment of deformed or obliquely formed lands on either or both sides of the communicating chambers 32 is advantageous in obtaining the desired cushioning of the application of hydraulic power steering effort by hydraulic control valves for power steering whether or not the central and end lands are of the same diameter and whether or not the hydraulic centering is omitted or handled by other means than employing a differential in the diameter of the center land and the end lands of the valve spool. By combining deformed or obliquely formed lands on either or both sides of the communicating chambers 32 with larger spill ports than pressure ports and/or larger diameter end spools than the center spool, the transition to power steering from mechanical steering and vice versa may be attained with great smoothness, specific performance and installation factors determining the particular combination best employed in any of the several types of power steering or booster power steering mechanisms.

The simplicity and economy of the hydraulic valve construction and the mounting thereof on the cross rod or other element of the steering gear linkage disclosed herein permits the use of hydraulic power steering in vehicles of many types in which hydraulic power steering was considered impractical or uneconomical.

Although but a single application of the invention to the power steering of vehicles has been disclosed and described herein, it is obvious that the invention may be modified to accommodate it to other power steering mechanisms, and that many changes in the size, shape, arrangement and detail of the several elements of the two embodiments of the invention herein disclosed may be made without departing from the spirit and scope thereof as defined by the appended claims.

I claim:

1. A control valve adapted for hydraulic power steering use comprising a pair of complementary members one of which is movable relative to the other, one of said members being fabricated to provide an annular inlet passageway, also a power port and an annular discharge passageway at each side of said annular inlet passageway, said annular discharge passageway interconnecting with a discharge port, the other of said members including a pair of end lands and a central land therebetween providing a pair of chambers positioned at opposite sides of said central land, the walls of the said lands adjacent said chambers being obliquely formed, each of said chambers communicating with the said inlet passageway and with the power port and the annular discharge passageway at the corresponding side of said central land when said members are in centered relation, whereby there is provided a pressure port between said inlet passageway and each of said chambers and a spill port between each chamber and the corresponding discharge passageway, said valve being characterized in operation in that movement of the movable valve member results in the gradual closing of one of said pressure ports and in the gradual further opening of the other pressure port, this action being accompanied by the simultaneous gradual closing of the spill port corresponding to the gradually opening pressure port and the simultaneous gradual opening of the other spill port, the obliqueness of the said walls serving to render smooth and progressive the application of the power steering effort responsive to the movement of the said movable member.

2. A control valve adapted for hydraulic power steering use comprising a pair of complementary members one of which is movable relative to the other, one of said members being fabricated to provide an annular inlet passageway, also a power port and an annular discharge passageway at each side of said annular inlet passageway, said annular discharge passageway interconnecting with a discharge port, the other of said members including a pair of end lands and a central land therebetween providing a pair of chambers positioned at opposite sides of said central land, the walls of said end lands adjacent said chambers being obliquely formed, each of said chambers communicating with the said inlet passageway and with the power port and the annular discharge passageway at the corresponding side of said central land when said members are in centered relation, whereby there is provided a pressure port between said inlet passageway and each of said chambers and a spill port between each chamber and the corresponding discharge passageway, said valve being characterized in operation in that movement of the movable valve member results in the gradual closing of one of said pressure ports and in the gradual further opening of the other pressure port, this action being accompanied by the simultaneous gradual closing of the spill port corresponding to the gradually opening pressure port and the simultaneous gradual opening of the other spill port, the obliqueness of the said walls serving to render smooth and progressive the application of the power steering effort responsive to the movement of the said movable member.

3. A control valve adapted for hydraulic power steering use comprising a pair of complementary members one of which is movable relative to the other, one of said members being fabricated to provide an annular inlet passageway, also a power port and an annular discharge passageway at each side of said annular inlet passageway, said annular discharge passage interconnecting with a discharge port, the other of said members including a pair of end lands and a central land therebetween providing a pair of chambers positioned at opposite sides of said central land, the walls of said central land adjacent said chambers being obliquely formed, each of said chambers communicating with the said inlet passageway and with the power port and the annular discharge passageway at the corresponding side of said central land when said members are in centered relation, whereby there is provided a pressure port between said inlet passageway and each of said chambers and a spill port between each chamber and the corresponding discharge passageway, said valve being characterized in operation in that movement of the movable valve member results in the gradual closing of one of said pressure ports and in the gradual further opening of the other pressure port, this action being accompanied by the simultaneous gradual closing of the spill port corresponding to the gradually opening pressure port and the simultaneous gradual opening of the other spill port, the obliqueness of the said walls serving to render smooth and progressive the application of the power steering effort responsive to the movement of the said movable member.

4. A control valve for hydraulic power steering comprising a pair of relatively movable complementary members adapted, respectively, for connection to a steering part and a steered part, one of said members being fabricated to provide an inlet passageway, also a power port and a discharge port at one side of said inlet passageway, the other of said members including a plurality of lands functional with respect to said passageway and said ports, each of said lands being disposed as a body on a line normal to the axis of such other member but having a wall portion obliquely formed so that in operation of the valve the power steering effort, responsive to the movement of the said movable member, is rendered smooth and progressive.

References Cited in the file of this patent

UNITED STATES PATENTS

| Number | Name | Date |
| --- | --- | --- |
| 476,228 | Hamilton | May 31, 1892 |
| 900,045 | Thomas | Sept. 29, 1908 |
| 1,774,213 | Tagliaferri | Aug. 26, 1930 |
| 1,943,061 | Douglas | Jan. 9, 1934 |
| 2,000,805 | West et al. | May 7, 1935 |
| 2,311,010 | Vickers | Feb. 16, 1943 |
| 2,370,137 | Biggert | Feb. 27, 1945 |
| 2,380,705 | Proctor | July 31, 1945 |
| 2,410,049 | Davis | Oct. 29, 1946 |
| 2,526,709 | Tait | Oct. 24, 1950 |